(12) United States Patent
Wu et al.

(10) Patent No.: US 12,517,385 B2
(45) Date of Patent: Jan. 6, 2026

(54) HIGH ISOLATION AND LOW INSERTION LOSS OPTICAL ISOLATOR

(71) Applicant: II-VI Delaware, Inc., Wilmington, DE (US)

(72) Inventors: Shuyu Wu, Fuzhou (CN); Dong Lin, Fuzhou (CN); Yunbing Xu, Fuzhou (CN)

(73) Assignee: II-VI DELAWARE, INC., Wilmington, DE (US)

( * ) Notice: Subject to any disclaimer, the term of this patent is extended or adjusted under 35 U.S.C. 154(b) by 813 days.

(21) Appl. No.: 17/649,605

(22) Filed: Feb. 1, 2022

(65) Prior Publication Data

US 2022/0291535 A1 Sep. 15, 2022

(30) Foreign Application Priority Data

Feb. 7, 2021 (CN) .......................... 202110187987.2

(51) Int. Cl.
| | |
|---|---|
| *G02F 1/09* | (2006.01) |
| *F21V 8/00* | (2006.01) |
| *G02B 6/27* | (2006.01) |
| *G02B 6/12* | (2006.01) |

(52) U.S. Cl.
CPC .............. *G02F 1/093* (2013.01); *G02B 6/002* (2013.01); *G02B 6/2746* (2013.01); *G02B 2006/12157* (2013.01)

(58) Field of Classification Search
CPC ......... G02F 1/093; G02B 6/002; G02B 6/274; G02B 2006/12157; G02B 6/2746
USPC ........................................ 359/484.03; 372/703
See application file for complete search history.

(56) References Cited

U.S. PATENT DOCUMENTS

| | | | | |
|---|---|---|---|---|
| 5,581,640 A | * | 12/1996 | Pan | G02F 1/093 |
| | | | | 385/11 |
| 5,706,371 A | * | 1/1998 | Pan | G02B 6/2746 |
| | | | | 385/11 |
| 6,075,642 A | * | 6/2000 | Chang | G02F 1/093 |
| | | | | 385/11 |
| 6,081,635 A | * | 6/2000 | Hehmann | G02B 6/2746 |
| | | | | 385/24 |
| 6,288,826 B1 | * | 9/2001 | Wills | G02F 1/093 |
| | | | | 359/489.09 |

(Continued)

FOREIGN PATENT DOCUMENTS

JP 07036001 A * 7/1995

*Primary Examiner* — Ricky D Shafer
(74) *Attorney, Agent, or Firm* — Blank Rome LLP

(57) ABSTRACT

An optical isolator has high isolation and low insertion loss in bandwidth. An input fiber collimator, isolator cores, and an output fiber collimator are connected in sequence in an optical path. Acute ends of wedge surfaces of lenses and fiber heads of the collimators are polished to form small platforms. Faraday crystals of the cores are optically active and are different in wavelength; birefringent wedges of the cores are different in wedge angle; and an optical axis of the birefringent wedges at an emitting end of the first core is perpendicular to an optical axis of the birefringent wedges at an incident end of the second core. The two stages of Faraday crystals with different wavelengths are overlaid to extend and widen isolation performance in bandwidth, and a small-spot collimator design is adopted so coupling loss is low, performance is stable, and reliability is high.

17 Claims, 2 Drawing Sheets

(56) References Cited

U.S. PATENT DOCUMENTS

| | | | | |
|---|---|---|---|---|
| 6,600,601 | B1* | 7/2003 | Ikari | G02F 1/093 359/489.09 |
| 6,876,491 | B2* | 4/2005 | Li | H01S 3/06754 385/47 |
| 7,023,618 | B2* | 4/2006 | Huang | G02B 5/3083 385/11 |
| 2001/0030807 | A1* | 10/2001 | Ikari | G02B 5/3083 359/489.17 |
| 2002/0135882 | A1* | 9/2002 | Xie | G02B 6/2746 359/619 |
| 2003/0048972 | A1* | 3/2003 | Lin | G02B 6/2746 385/11 |
| 2004/0070827 | A1* | 4/2004 | Li | G02B 6/2746 359/484.04 |
| 2011/0038046 | A1* | 2/2011 | Kawamura | G02B 6/2746 359/484.03 |
| 2012/0294565 | A1* | 11/2012 | Iida | G02F 1/093 385/14 |

\* cited by examiner

HIGH ISOLATION AND LOW INSERTION LOSS OPTICAL ISOLATOR

CROSS-REFERENCE TO RELATED APPLICATIONS

This application claims priority to Chinese Application No. 202110187987.2, filed Feb. 7, 2021, the entire contents of which are hereby incorporated by reference herein.

TECHNICAL FIELD

The present disclosure relates to the technical field of optical fiber communication, and in particular to an optical isolator with high isolation and low insertion loss in bandwidth.

BACKGROUND

With the continuous development of optical fiber communication towards large capacity and high speed, the requirements on bandwidth performance of optical fiber amplifiers are higher and higher. Therefore, it has become an urgent need to provide an isolator with high isolation and low insertion loss in bandwidth; especially in the field of submarine cables, the maintenance cost is extremely high, so an isolator with high isolation, low insertion loss, and high reliability is required, while ordinary isolators can hardly meet the requirements.

In an existing technical solution, methods to improve the bandwidth isolation include: overlaying two single-stage isolator cores with the same wavelength (rotation by 45 degrees between two stages); or combining a ¼ wave plate and a ½ wave plate to compensate for angular dispersion of optically active crystals, thereby improving the bandwidth isolation. These methods have the defects that the improved bandwidth isolation performance is limited, thus cannot meet the requirement of ultra-high isolation (>48 dB under the total temperature) at the shortwave (near 1530 nm) that is particularly required by an Erbium-Doped Fiber Amplifier (EDFA). In addition, the material precision requirements are high, and the process assembly is difficult, which increase the manufacturing cost.

SUMMARY OF THE DISCLOSURE

The objective of the present disclosure is to provide an optical isolator having high isolation and low insertion loss in bandwidth. The disclosed optical isolator is preferably able to meet a requirement of ultra-high isolation (e.g., greater than 48 dB under the total temperature) for the shortwave (near 1530 nm) required by an Erbium-Doped Fiber Amplifier (EDFA).

In order to implement the above objective, the present disclosure adopts the following technical solutions.

An optical isolator with high isolation and low insertion loss in bandwidth is provided. The optical isolator is provided with an input fiber collimator, a dual-stage optical isolator core, and an output fiber collimator connected in sequence in the direction of an optical path.

Acute ends of wedge surfaces of lenses and fiber heads of the input and output fiber collimators are polished to form "small" platforms, respectively. In other words, the platforms are "small" in the sense that width dimensions of the platforms are not higher than ¼ of the diameters of the lenses or the fiber heads.

The dual-stage optical isolator core includes a first-stage optical isolation assembly (a first isolator core) and a second-stage optical isolation assembly (a second isolator core). The first-stage and second-stage optical isolation assemblies each include two birefringent wedge pieces and one Faraday crystal. Each Faraday crystal is optically active and is placed between the corresponding two birefringent wedge pieces.

The Faraday crystals adopted by the first-stage and second-stage optical isolation assemblies respectively are different in wavelength, and the birefringent wedge pieces adopted by the first-stage and second-stage optical isolation assemblies respectively are different in wedge angle.

A first optical axis of the birefringent wedge pieces at an emitting end of the first-stage optical isolation assembly is perpendicular to a second optical axis of the birefringent wedge pieces at an incident end of the second-stage optical isolation assembly.

Further, there is no adhesive in the optical paths of the input fiber collimator and the output fiber collimator. A polishing method used to produce the small platforms includes: polishing on angled cushion blocks first to obtain the wedge surfaces, and polishing the acute ends of the wedge surfaces on a zero-angle plane cushion block. Width dimensions of the obtained small platforms are not higher than ¼ of diameters of the lenses or the fiber heads.

Further, the input and output fiber collimators are both small-spot collimators with a spot value smaller than or equal to 300 μm.

Further, each of the Faraday crystals is of a type having a magnetic field itself or a type needing an externally applied magnetic field.

Further, the wedge angle of each of the birefringent wedge pieces in the first-stage optical isolation assembly is ½ of or 2 times the wedge angle of each of the birefringent wedge pieces in the second-stage optical isolation assembly.

Further, the birefringent wedge pieces in the first-stage optical isolation assembly and the second-stage optical isolation assembly can both be made of a yttrium orthovanadate (YVO4) material. The wedge angle of each of the birefringent wedge pieces in the first-stage optical isolation assembly can be 4 degrees, and the wedge angle of each of the birefringent wedge pieces in the second-stage optical isolation assembly can be 8 degrees.

The present disclosure has the following beneficial technical effects: the two optically active crystals with different wavelengths are combined and overlaid to widen the isolation performance in bandwidth. Especially for the shortwave (near 1530 nm) required by an EDFA, a combination of Faraday optically active crystals with wavelengths of 1520 nm and 1560 nm can be selected to meet a requirement of ultra-high isolation (e.g., isolation greater than 48 dB under the total temperature). The feature of being less sensitive to the angular coupling of the small-spot collimators is utilized to achieve low insertion loss performance. The process assembly method is simple, and the product is stable in structure and high in reliability.

BRIEF DESCRIPTION OF THE DRAWINGS

The following describes the present disclosure in further detail with reference to the accompanying drawings and the detailed description.

DETAILED DESCRIPTION

Figure 1:
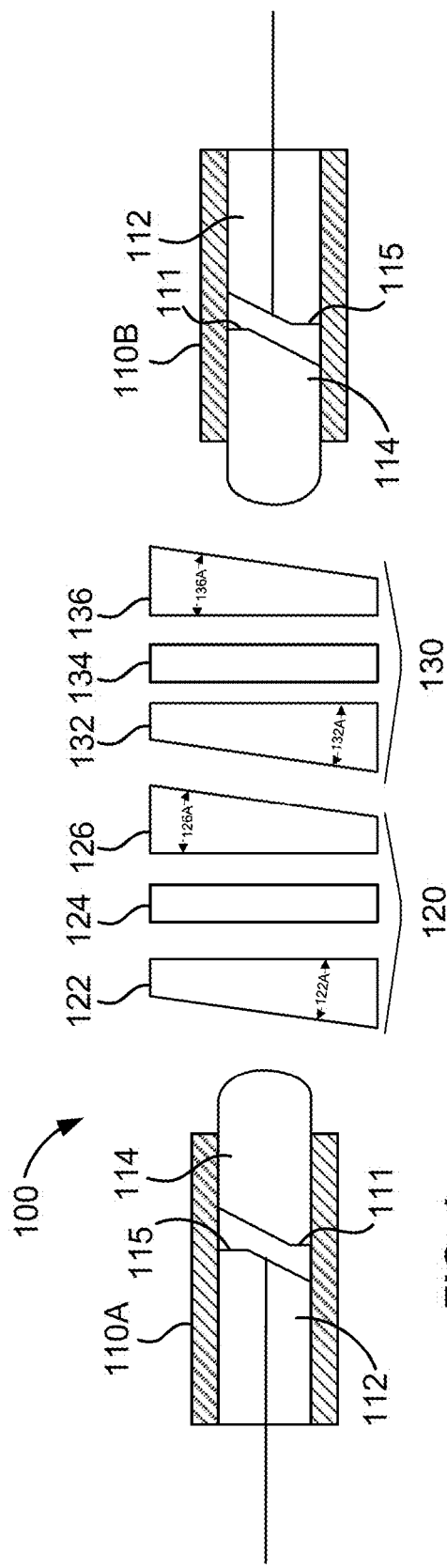
FIG. 1 is a schematic diagram of an optical isolator according to the present disclosure having high isolation and low insertion loss in bandwidth.

As shown in FIG. 1, an optical isolator 100 with high isolation and low insertion loss in bandwidth of the present disclosure includes an input fiber collimator 110A, a dual-stage optical isolator core 120, 130, and an output fiber collimator 110B connected in sequence in the direction of an optical path.

Acute ends of wedge surfaces of lenses and fiber heads of the input fiber collimator 110A and the output fiber collimator 110B are polished to form "small" platforms 111, 115, respectively. In other words, the platforms 111, 115 are "small" in the sense that width dimensions of the platforms are not higher than ¼ of diameters of the lenses or the fiber heads.

The dual-stage optical isolator core includes a first-stage optical isolation assembly 120 and a second-stage optical isolation assembly 130. The first-stage optical isolation assembly 120 and the second-stage optical isolation assembly 130 each include two birefringent wedge pieces 122 and 126, or 132 and 136 and one Faraday optically active crystal 124 or 134. The Faraday optically active crystal 124 or 134 is placed between corresponding two birefringent wedge pieces 122 and 126, or 132 and 136. The Faraday optically active crystals 124 and 134 are of a type with a magnetic field themself or a type needing an externally applied magnetic field.

The Faraday optically active crystals 124 and 134 adopted by the first-stage optical isolation assembly 120 and the second-stage optical isolation assembly 130 respectively are different in wavelength, and the birefringent wedge pieces 122, 124, 132 and 136 adopted by the first-stage optical isolation assembly 120 and the second-stage optical isolation assembly 130 respectively are different in wedge angle.

An optical axis of the birefringent wedge pieces 122 and 126 at an emitting end of the first-stage optical isolation assembly 120 is perpendicular to an optical axis of the birefringent wedge pieces 132 and 136 at an incident end of the second-stage optical isolation assembly 130.

Figure 2:
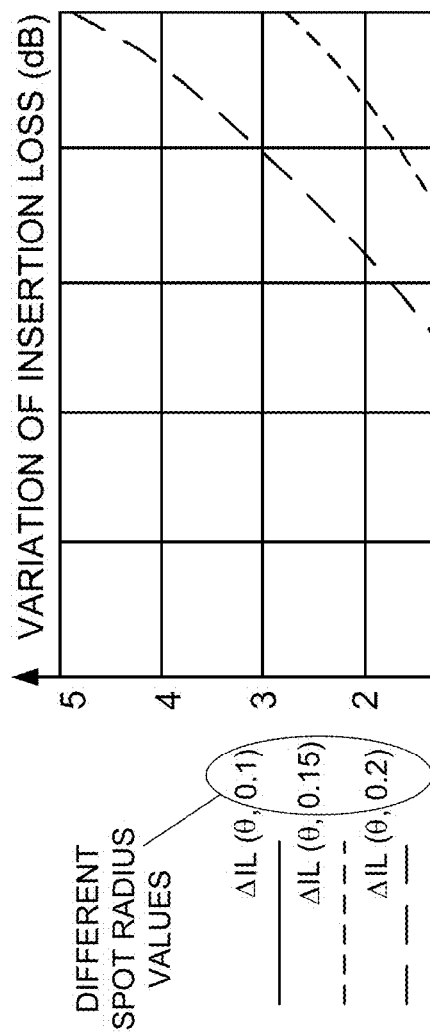
FIG. 2 is a graph of relationship between variation of an insertion loss and a coupling angle of a small-spot collimator of the present disclosure.

There is no adhesive in the optical paths of the input fiber collimator 110A and output fiber collimator 110B. A polishing method of the small platforms 111, 115 includes: polishing on angled cushion blocks first to obtain the wedge surfaces (the typical angle is 8 degrees), and then polishing the acute ends of the wedge surfaces on a zero-angle plane cushion block. Width dimensions of the obtained small platforms 111, 115 are not higher than ¼ of the diameters of the lenses 114 or the fiber heads 112. In addition, the input fiber collimator 110A and the output fiber collimator 110B are both small-spot collimators with a spot value small than or equal to 300 μm. As shown in FIG. 2, smaller spot values leads to smaller coupling loss due to angular changes during a beam coupling process. In addition, an insertion loss value is more stable.

As shown in FIG. 1, collimated light emitted from input fiber collimator 110A enters the dual-stage optical isolator core 120, 130, passes through first birefringent wedge piece 122, and is then divided into two beams of o-light and e-light with polarization states being perpendicular. The light then passes through the Faraday optically active crystal 124 that rotates a polarization direction of the light beams by 45 degrees. The light beams are coupled into the birefringent wedge piece 126, which is forward transmission of the first-stage optical isolation assembly 120. Thereafter, the light beams enter the birefringent wedge piece 132, and similarly, forward transmission of the second-stage optical isolation assembly 130 is performed. Because the optical axis of the birefringent wedge piece 132 is perpendicular to that of the birefringent wedge piece 126, the o-light and e-light of the beams is converted, thereby compensating for polarization mode dispersion (PMD) of the dual-stage isolator core 120, 130.

When the light beams are transmitted in the reverse direction, the collimated light emitted from output fiber collimator 110B enters the dual-stage optical isolator core 120, 130, passes through the birefringent wedge piece 136, and is divided into two beams of o-light and e-light with polarization states being perpendicular. The o-light and e light enters the Faraday optically active crystal 134. Due to non-reciprocity of optically active materials, the polarization states of the o-light and the e-light continue to rotate by 45 degrees in the direction of rotation during forward transmission. That is, when the two beams of light enter the birefringent wedge piece 132, the o-light and the e-light have been converted. A combination of the two parallel birefringent wedge pieces 132, 136 in the same stage is equivalent to a Wollaston prism for the reverse light. The two beams of light deviate from the original direction to produce a certain displacement and angle, and then one stage of reverse isolation spectral lines can be formed. After the light beams are emitted from the birefringent wedge piece 132, similarly, reverse transmission in the next stage of isolator core continues. The Faraday optically active crystals 134 and 124 used in the two stages of the optical isolation assemblies 120, 130 are different in wavelength, which can overlay isolation spectral lines of different wavelengths to achieve the effect of widening the isolation in bandwidth.

Figure 3:
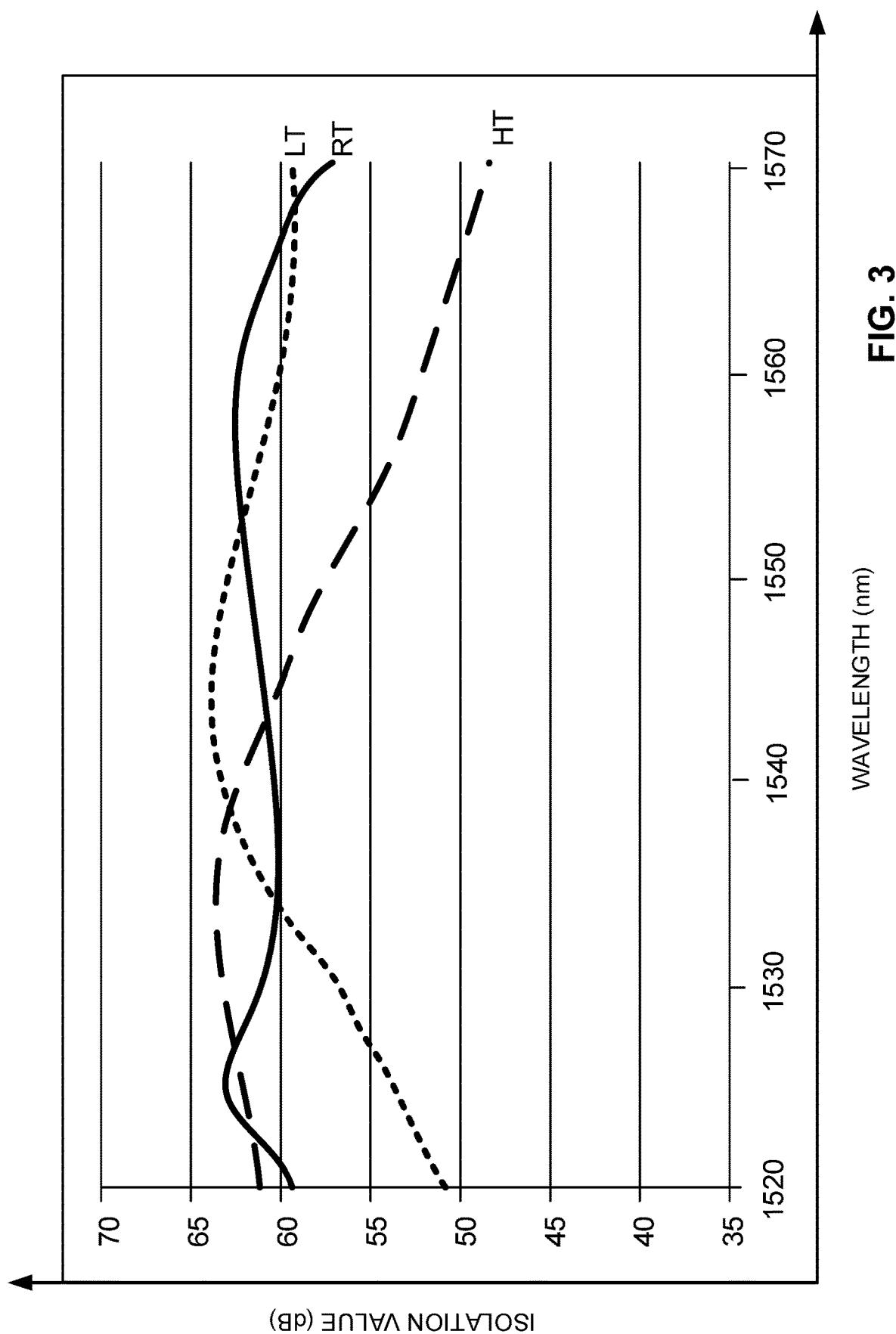
FIG. 3 is a spectral line diagram of isolation after widening of the present disclosure.

As shown in FIG. 3, a combination of Faraday optically active crystals with wavelengths of 1520 nm and 1560 nm is typically selected to meet the requirement of ultra-high isolation (e.g., greater than 48 dB under the total temperature at a waveband near 1530 nm). At the same time, overlaying of wavelengths can also smooth a wavelength dependent loss (WDL) and further reduce an insertion loss value in bandwidth.

In the present disclosure, the wedge angle 122A, 126A of the birefringent wedge pieces 122 and 126 in first-stage optical isolation assembly 120 is ½ of or 2 times the wedge angle 132A, 136A of the birefringent wedge pieces 132 and 136 in the second-stage optical isolation assembly 130. If the birefringent wedge pieces 122, 126, 132 and 136 in the first and second-stage optical isolation assemblies 120, 130 are all made of a Yttrium orthovanadate (YVO4) material, typically, the wedge angle 122A, 126A of the birefringent wedge pieces 122 and 126 in the first-stage optical isolation assembly 120 is 4 degrees, and the wedge angle 132A, 136A of the birefringent wedge pieces 132 and 136 in the second-stage optical isolation assembly is 8 degrees.

Compared with the prior art, the optical isolator 100 with high isolation and low insertion loss in bandwidth provided by the present disclosure has excellent isolation and insertion loss performance, the process assembly method is simple, and the product is stable in structure and high in reliability.

The implementation of the present disclosure is described above with reference to the accompanying drawings. However, the present disclosure is not limited to the above-mentioned detailed description. The above-mentioned detailed description is illustrative rather than limiting the present disclosure. Those of ordinary skill in the art should understand that the technical solutions recorded in the foregoing embodiments may be modified, or some of or all the technical features therein may be equivalently replaced; and these modifications or replacements do not cause the essence of the corresponding technical solutions to deviate from the scope of the technical solutions of the embodiments of the present disclosure, and shall be covered in the scope of the claims and specification of the present disclosure.

What is claimed is:

1. An optical isolator, comprising:
   an input fiber collimator, a dual-stage optical isolator core, and an output fiber collimator connected in sequence in a direction of an optical path;
   the input and output fiber collimators each having a lens and a fiber head, acute ends of wedge surfaces of the lenses and the fiber heads being polished to form platforms; and
   the dual-stage optical isolator core at least including a first-stage optical isolation assembly and a second-stage optical isolation assembly, each of the first-stage and second-stage optical isolation assemblies at least including two birefringent wedge pieces, and one Faraday optically active crystal placed between the corresponding two birefringent wedge pieces;
   the Faraday optically active crystals for the first-stage and second-stage optical isolation assemblies being different in wavelength,
   the birefringent wedge pieces for the first-stage optical isolation assembly having at least one first wedge angle and the birefringent wedge pieces for the second-stage optical isolation assembly having at least one second wedge angle, wherein the at least one first wedge angle and the at least one second wedge angle are different from each other,
   one of the birefringent wedge pieces for the first-stage optical isolation assembly is a birefringent wedge piece at an emitting end of the first-stage optical isolation assembly, one of the birefringent wedge pieces for the second-stage optical isolation assembly is a birefringent wedge piece at an incident end of the second-stage optical isolation assembly, the birefringent wedge piece at the emitting end having an optical axis perpendicular to a second optical axis of the birefringent wedge piece at the incident end,
   wherein the birefringent wedge pieces for the first-stage optical isolation assembly each having the same first wedge angle and the birefringent wedge pieces for the second-stage optical isolation assembly each having the same second wedge angle.

2. The optical isolator of claim 1, wherein the input fiber collimator and the output fiber collimator have the optical path therebetween lacking adhesive.

3. The optical isolator of claim 1, wherein each of the Faraday optically active crystals is of a type having a magnetic field itself or a type needing an externally applied magnetic field.

4. The optical isolator of claim 1, wherein the at least one first wedge angle of each of the birefringent wedge pieces in the first-stage optical isolation assembly is ½ of the wedge angle of each of the birefringent wedge pieces in the second-stage optical isolation assembly.

5. The optical isolator of claim 1, wherein the at least one first wedge angle of each of the birefringent wedge pieces in the first-stage optical isolation assembly is 2 times the wedge angle of each of the birefringent wedge pieces in the second-stage optical isolation assembly.

6. The optical isolator of claim 1, wherein the birefringent wedge pieces in the first-stage optical isolation assembly and the second-stage optical isolation assembly are both made of a Yttrium orthovanadate (YVO4) material, the at least one first wedge angle of each of the birefringent wedge pieces in the first-stage optical isolation assembly is 4 degrees, and the at least one second wedge angle of each of the birefringent wedge pieces in the second-stage optical isolation assembly is 8 degrees.

7. An optical isolator, comprising:
   an input fiber collimator, a dual-stage optical isolator core, and an output fiber collimator connected in sequence in a direction of an optical path;
   the input and output fiber collimators each having a lens and a fiber head, acute ends of wedge surfaces of the lenses and the fiber heads being polished to form platforms, wherein width dimensions of the platforms are not higher than ¼ of diameters of the lenses or the fiber heads; and
   the dual-stage optical isolator core at least including a first-stage optical isolation assembly and a second-stage optical isolation assembly, each of the first-stage and second-stage optical isolation assemblies at least including two birefringent wedge pieces, and one Faraday optically active crystal placed between the corresponding two birefringent wedge pieces;
   the Faraday optically active crystals for the first-stage and second-stage optical isolation assemblies being different in wavelength,
   the birefringent wedge pieces for the first-stage and second-stage optical isolation assemblies being different in wedge angle,
   one of the birefringent wedge pieces for the first-stage optical isolation assembly is a birefringent wedge piece at an emitting end of the first-stage optical isolation assembly, one of the birefringent wedge pieces for the second-stage optical isolation assembly is a birefringent wedge piece at an incident end of the second-stage optical isolation assembly, the birefringent wedge piece at the emitting end having an optical axis perpendicular to a second optical axis of the birefringent wedge piece at the incident end.

8. The optical isolator of claim 7, wherein the birefringent wedge pieces for the first-stage optical isolation assembly each having the same first wedge angle and the birefringent wedge pieces for the second-stage optical isolation assembly each having the same second wedge angle.

9. An optical isolator, comprising:
   an input fiber collimator, a dual-stage optical isolator core, and an output fiber collimator connected in sequence in a direction of an optical path;
   the input and output fiber collimators each having a lens and a fiber head, acute ends of wedge surfaces of the lenses and the fiber heads being polished to form platforms, wherein each of the input and output fiber collimators is a small-spot collimator having a spot value smaller than or equal to 300 μm; and
   the dual-stage optical isolator core at least including a first-stage optical isolation assembly and a second-stage optical isolation assembly, each of the first-stage and second-stage optical isolation assemblies at least including two birefringent wedge pieces, and one Faraday optically active crystal placed between the corresponding two birefringent wedge pieces;

the Faraday optically active crystals for the first-stage and second-stage optical isolation assemblies being different in wavelength, the birefringent wedge pieces for the first-stage and second-stage optical isolation assemblies being different in wedge angle, one of the birefringent wedge pieces for the first-stage optical isolation assembly is a birefringent wedge piece at an emitting end of the first-stage optical isolation assembly, one of the birefringent wedge pieces for the second-stage optical isolation assembly is a birefringent wedge piece at an incident end of the second-stage optical isolation assembly, the birefringent wedge piece at the emitting end having an optical axis perpendicular to a second optical axis of the birefringent wedge piece at the incident end.

10. An optical isolator, comprising:

a first fiber collimator, a first isolator core, a second isolator core, and a second fiber collimator connected in sequence in a direction of an optical path;

the first and second fiber collimators each having a lens and a fiber head, acute ends of wedge surfaces of the lenses and the fiber heads being polished to form platforms;

the first isolator core at least including: at least two first birefringent wedges having at least one wedge angle, and a first Faraday crystal, the first Faraday crystal being optically active and being placed between the first birefringent wedges, one of the first birefringent wedges being at an emitting end of the optical isolator and having a first optical axis;

the second isolator core at least including: at least two second birefringent wedges having at least one wedge angle, and a second Faraday crystal, the second Faraday crystal being optically active and being placed between the second birefringent wedges, the second Faraday crystal being different in wavelength from the first Faraday crystal, the at least two second birefringent wedges being different in wedge angle from the at least two first birefringent wedges, one of the second birefringent wedges being at an incident end of the optical isolator and having a second optical axis being perpendicular to the first optical axis.

11. The optical isolator of claim 10, wherein the first and second fiber collimators have the optical path therebetween lacking adhesive.

12. The optical isolator of claim 10, wherein each of the first and second Faraday crystals comprises a type having a magnetic field itself, or a type needing an externally applied magnetic field.

13. The optical isolator of claim 10, wherein the at least one first wedge angle of each of the first birefringent wedges is ½ of the at least one second wedge angle of each of the second birefringent wedges.

14. The optical isolator of claim 10, wherein the at least one first wedge angle of each of the first birefringent wedges is 2 times the at least one second wedge angle of each of the second birefringent wedges.

15. The optical isolator of claim 10, wherein the first and second birefringent wedges comprise a yttrium orthovanadate (YVO4) material, the at least one first wedge angle of each of the first birefringent wedges is 4 degrees, and the at least one second wedge angle of each of the second birefringent wedges is 8 degrees.

16. An optical isolator, comprising:

a first fiber collimator, a first isolator core, a second isolator core, and a second fiber collimator connected in sequence in a direction of an optical path;

the first and second fiber collimators each having a lens and a fiber head, acute ends of wedge surfaces of the lenses and the fiber heads being polished to form platforms wherein width dimensions of the platforms are not higher than ¼ of diameters of the lenses or the fiber heads;

the first isolator core at least including: first birefringent wedges, and a first Faraday crystal, the first Faraday crystal being optically active and being placed between the first birefringent wedges, the first birefringent wedge at an emitting end of the optical isolator having a first optical axis;

the second isolator core at least including: second birefringent wedges, and a second Faraday crystal, the second Faraday crystal being optically active and being placed between the second birefringent wedges, the second Faraday crystal being different in wavelength from the first Faraday crystal, the second birefringent wedges being different in wedge angle from the first birefringent wedges, the second birefringent wedge at an incident end of the optical isolator having a second optical axis being perpendicular to the first optical axis.

17. An optical isolator, comprising:

a first fiber collimator, a first isolator core, a second isolator core, and a second fiber collimator connected in sequence in a direction of an optical path;

the first and second fiber collimators each having a lens and a fiber head, acute ends of wedge surfaces of the lenses and the fiber heads being polished to form platforms, wherein each of the first and second fiber collimators comprises a small-spot collimator having a spot value smaller than or equal to 300 μm the first isolator core at least including: first birefringent wedges, and a first Faraday crystal, the first Faraday crystal being optically active and being placed between the first birefringent wedges, the first birefringent wedge at an emitting end of the optical isolator having a first optical axis;

the second isolator core at least including: second birefringent wedges, and a second Faraday crystal, the second Faraday crystal being optically active and being placed between the second birefringent wedges, the second Faraday crystal being different in wavelength from the first Faraday crystal, the second birefringent wedge being different in wedge angle from the first birefringent wedges, the second birefringent wedges at an incident end of the optical isolator having a second optical axis being perpendicular to the first optical axis.

* * * * *